United States Patent [19]

Kaneko et al.

[11] Patent Number: 5,294,684
[45] Date of Patent: Mar. 15, 1994

[54] PROCESS FOR PRODUCING VINYL CHLORIDE RESIN

[75] Inventors: Ichiro Kaneko, Hazaki; Makoto Fujiwara; Tatsuya Fujimoto, both of Kamisu, all of Japan

[73] Assignee: Shin-Etsu Chemical Co., Ltd., Tokyo, Japan

[21] Appl. No.: 973,570

[22] Filed: Nov. 9, 1992

Related U.S. Application Data

[63] Continuation-in-part of Ser. No. 703,857, May 21, 1991, abandoned.

[30] Foreign Application Priority Data

May 22, 1990 [JP] Japan ................ 2-132246

[51] Int. Cl.$^5$ ................ C08F 2/18
[52] U.S. Cl. ................ 526/62; 526/88; 526/344.2
[58] Field of Search ................ 526/62, 88

[56] References Cited

U.S. PATENT DOCUMENTS

| | | | |
|---|---|---|---|
| 4,228,268 | 10/1980 | Musha | 526/344.2 |
| 4,758,639 | 7/1988 | Koyanagi | 526/62 |
| 4,845,174 | 7/1989 | Amano | 526/62 |
| 4,933,399 | 6/1990 | Shimizu | 526/62 |

FOREIGN PATENT DOCUMENTS 146140  1/1981  Fed. Rep. of Germany.

*Primary Examiner*—Christopher Henderson
*Attorney, Agent, or Firm*—Oblon, Spivak, McClelland, Maier & Neustadt

[57] ABSTRACT

A process for producing a vinyl chloride polymer by polymerizing a monomer comprising vinyl chloride by suspension polymerization in a polymerization vessel on the inner wall surface of which a coating of a polymer scale preventive agent is formed, comprising the steps of applying a high-speed shearing force to a mixture comprising water, the monomer, a polymerization initiator, and (A) a dispersant comprising a partially saponified polyvinyl alcohol having a specified average degree of polymerization and a specified degree of saponification plus (B) a dispersant comprising a hydroxypropylmethylcellulose which has a specified methoxyl substitution degree, a specified hydroxypropoxyl substitution degree, and a specified viscosity and subjecting the mixture to said suspension polymerization. A vinyl chloride polymer having an average particle diameter of 200 to 600 μm and a narrow particle size distribution and excellent in plasticizer take-up, etc. is provided.

15 Claims, No Drawings

PROCESS FOR PRODUCING VINYL CHLORIDE RESIN

This application is a continuation-in-part of application Ser. No. 07/703,857, filed on May 21, 1991, now abandoned.

BACKGROUND OF THE INVENTION

1. Field of the Invention

The present invention relates to a process for producing a vinyl chloride resin, and more particularly to a process for producing stably a vinyl chloride resin having an average particle diameter of 200 to 600 $\mu$m and excellent in physical properties such as plasticizer take-up.

2. Description of Prior Art

The method of polymerizing various water-insoluble monomers such as vinyl chloride includes suspension polymerization. The physical properties of polymer particles produced by the suspension polymerization such as the average particle diameter, apparent specific gravity (bulk specific gravity), monomer elimination, plasticizer take-up, and fish eyes vary depending on slight differences in the polymerization conditions. For this reason, various studies for polymerization conditions have long been made in order to obtain polymer particles with good physical properties.

Since vinyl chloride polymers having a large particle diameter of about 200 to 600 $\mu$m on the average are low-dusting and are favorable in dry flowability after the take-up of a plasticizer, they are quite useful as readily handlable soft polyvinyl chlorides and therefore the production of polymer particles having such a large particle diameter and excellent in physical properties such as plasticizer take-up is desired.

However, the prior method of producing vinyl chloride polymers gives polymer particles having an average particle diameter of 100 to 150 $\mu$m mainly and a method that can produce stably polymer particles having an average particle diameter of 200 to 600 $\mu$m has not yet been known.

To produce a vinyl chloride polymer consisting of polymer particles having such a large particle diameter by the prior manufacturing method, it is generally required to decrease the amount of the dispersant to be used. However, only when the amount of the dispersant to be used is decreased, the particle diameter of the produced polymer particles has a very broad particle size distribution, i.e., ranges from several $\mu$m to 1 mm or over and in extreme cases the whole polymerization system coagulates. Even if a polymer is obtained, the polymer is poor in physical properties such as plasticizer take-up. Further, in the production of vinyl chloride polymers, although it is often practiced that a coating of a polymer scale preventive agent for preventing the deposition of polymer scale is formed on the wall of the polymerization vessel, etc., if the amount of the dispersant is decreased, polymer scale is liable to form on the polymerization vessel wall due to the lowering of the polymer scale preventive effect of the polymer scale preventive agent applied to the polymerization vessel wall in the course of the polymerization. When polymer scale deposits, the deposited polymer scale comes off and interfuses into the product polymer, which caused a problem that the quality of the product polymer lowers.

On the other hand, Japanese Patent Publication (kokoku) No. 63-56245 (1988) discloses a process for producing a vinyl chloride polymer wherein a high-speed shearing force is applied to a polymerization system and then suspension polymerization is performed. However, since the process disclosed in that publication is applied to the production of a vinyl chloride polymer particularly for paste resins, the process is intended for the production of very fine polymer particles having a particle diameter of several $\mu$m to tens $\mu$m. Therefore, in this process, it is essential to use a dispersant in a relatively large amount, i.e., in an amount of 0.1 to 3 parts by weight per 100 parts by weight of the monomer. Consequently, it is impossible to produce polymer particles having a large particle diameter using this process.

SUMMARY OF THE INVENTION

An object of the present invention is to provide a process for producing a vinyl chloride polymer by suspension polymerization wherein a vinyl chloride polymer particularly having an average particle diameter of 200 to 600 $\mu$m and excellent in physical properties such as plasticizer take-up can be produced stably and deposition of polymer scale on the wall of the polymerization vessel hardly occurs.

That is, to attain the above object, the present invention provides a process for producing a vinyl chloride polymer having an average particle diameter of 200 to 600 $\mu$m by polymerizing a monomer having an ethylenic double bond and comprising vinyl chloride as an essential component in an aqueous medium by suspension polymerization in a polymerization vessel on the inner wall surface of which a coating of a polymer scale preventive agent has been previously formed, comprising the steps of previously applying a high-speed shearing force to a mixture comprising water, said monomer, a polymerization initiator, and (A) a dispersant comprising a partially saponified polyvinyl alcohol having an average degree of polymerization of 1,500 to 2,500 and a degree of saponification of 70 to 99 mol % plus (B) a dispersant comprising a hydroxypropylmethylcellulose which has a methoxyl substitution degree of 15 to 35 wt. % and a hydroxypropoxyl substitution degree of 4 to 15 wt. % and the 2 wt. % aqueous solution of which has a viscosity of 5 to 4,000 cP at 20° C., with the weight ratio (A)/(B) of the dispersant (A) to (B) being from 1/20 to 4/6 and the combined amount of the dispersant (A) and the dispersant (B) being 0.01 to 0.05 part by weight per 100 parts by weight of said monomer, and then subjecting the mixture to said suspension polymerization in said polymerization vessel under an agitation power of 50 to 200 kg.m/sec.ton.

According to the present process for producing a vinyl chloride polymer, polymer particles having a large particle diameter of 200 to 600 $\mu$m on the average and a narrow particle size distribution can be produced stably. In addition, the obtained polymer has excellent physical properties, i.e., it is excellent in plasticizer take-up and low in apparent specific gravity and scarcely forms fish eyes. Therefore, the vinyl chloride polymer produced by the present process is quite useful as a soft polyvinyl chloride that is low-dusting, good in dry flowability after the take-up of a plasticizer, and easy to handle.

Further, when a vinyl chloride polymer is produced by the present process, since the amounts of dispersants to be used are small, the polymer scale preventive effect possessed by the polymer scale preventive agent itself that is applied to the polymerization vessel wall is not lowered and therefore polymer scale does not deposit on the polymerization vessel wall, etc. Consequently, the infusion of polymer scale, which will otherwise deposit and come off, into the product polymer does not occur, as a result a high-quality product polymer can be obtained and since it is not required to carry out the removal of polymer scale frequently, it is favorable in view of the labor hygiene and the productivity is also improved.

DETAILED DESCRIPTION OF PREFERRED EMBODIMENTS

Now the present invention will be described in detail.

DISPERSANTS

In the present process for producing a vinyl chloride polymer, two types of dispersants, i.e., a dispersant (A) comprising a partially saponified polyvinyl alcohol and a dispersant (B) comprising a hydroxypropylmethylcellulose are used in combination.

It is required that the partially saponified polyvinyl alcohol of the dispersant (A) has an average degree of polymerization of 1,500 to 2,500 and a degree of saponification of 70 to 99 mol % and particularly preferably it has an average degree of polymerization of 1,700 to 2,200 and a degree of saponification of 75 to 85 mol %. If the average degree of polymerization is less than 1,500 or the degree of saponification is less than 70 mol %, a polymer having an average particle diameter of 200 to 600 $\mu$m cannot be produced stably and positively, in addition the stability of the suspension of the monomer lowers and polymer scale is apt to form on the polymerization vessel wall, etc. in the course of the polymerization. If the average degree of polymerization is over 2,500 or the degree of saponification is over 99 mol %, since the surface activity lowers, the porosity of the obtained polymer particles decreases and therefore the plasticizer take-up also decreases.

It is required that the hydroxypropylmethylcellulose of the dispersant (B) has a methoxyl substitution degree of 15 to 35 wt. % and a hydroxypropoxyl substitution degree of 4 to 15 wt. % and particularly preferably it has a methoxyl substitution degree of 19 to 30 wt. % and a hydroxypropoxyl substitution degree of 6 to 12 wt. %.

If the methoxyl substitution degree is less than 15 wt. % or the hydroxypropoxyl substitution degree is less than 4 wt. %, the plasticizer take-up of the obtained polymer lowers. Further if the methoxyl substitution degree is over 35 wt. % or the hydroxypropoxyl substitution degree is over 15 wt. %, the particle size distribution of the obtained polymer particles becomes broad and a polymer having an average particle diameter of 200 to 600 $\mu$m cannot be produced stably.

Further, it is required that the viscosity of the 2 wt. % aqueous solution of the hydroxypropylmethylcellulose of the dispersant (B) is 5 to 4,000 cP at 20° C. and particularly preferably the viscosity of the 2 wt. % aqueous solution is 50 to 2,000 cP at 20° C. If the viscosity of the 2 wt. % aqueous solution is less than 5 cP at 20° C., the particle size distribution of the obtained polymer particles becomes broad. Further, if the viscosity of the 2 wt. % aqueous solution is over 4,000 cP at 20° C., the plasticizer take-up of the obtained polymer decreases.

The amounts of the dispersants (A) and (B) to be charged can be adjusted over a wide range depending on the particle diameter of the intended vinyl chloride polymer although it is required that the weight ratio (A)/(B) of the dispersants is from 1/20 to 4/6, preferably from 1/15 to 4/6. If the weight ratio (A)/(B) of the dispersants is less than 1/20, the plasticizer take-up of the obtained vinyl chloride lowers. Further if the weight ratio (A)/(B) of the dispersants is over 4/6, the polymerization system becomes unstable and the produced polymer particles become coarse, which sometimes leads to a risk that the whole polymerization system coagulates.

It is required that the combined amount of the dispersant (A) and the dispersant (B) is 0.01 to 0.05 part by weight per 100 part by weight of the monomer and preferably the combined amount is 0.02 to 0.04 part by weight per 100 parts by weight of the monomer. If the combined amount of the dispersants (A) and (B) is less than 0.01 part by weight per 100 part by weight of the monomer, the polymerization system becomes unstable and sometimes it leads to a risk that the polymerization system coagulates. Further, if the combined amount of the dispersants (A) and (B) is over 0.05 part by weight per 100 parts by weight of the monomer, the particle diameter of the obtained polymer particles will become too small.

In the present process, in addition to the dispersants (A) and (B), if required, other dispersants used conventionally in the polymerization of usual vinyl chloride polymers may be added.

MONOMERS

The monomer to be polymerized in the present process is a monomer having an ethylenic double bond comprising vinyl chloride as an essential component and may comprise vinyl chloride alone or a monomer mixture comprising vinyl chloride as a major component and other comonomer copolymerizable with the vinyl chloride with the content of the vinyl chloride generally amounting to 50 wt. % or more.

Examples of the other monomer having an ethylenic double bond used as a comonomer copolymerizable with vinyl chloride are vinyl esters such as vinyl acetate and vinyl propionate, acrylates such as methyl acrylate and ethyl acrylate, methacrylates, olefins such as ethylene and propylene, maleic anhydride, acrylonitrile, styrene, and vinylidene chloride, which may be used singly or as a mixture of two or more.

POLYMERIZATION INITIATORS

The polymerization initiator may be any one conventionally used in polymerization of vinyl chloride or the like and for example includes peroxides such as 3,5,5-trimethylhexanoyl peroxide, cumene hydroperoxide, cyclohexanone peroxide, benzoyl peroxide, lauroyl peroxide, 2,4-dichlorobenzoyl peroxide, p-methane hydroperoxide, t-butyl peroxyneodecanoate, $\alpha$-cumyl peroxydecanoate, t-butyl peroxypivalate, bis(2-ethylhexyl) peroxydicarbonate, bis(2-ethoxyethyl) peroxydicarbonate, and diisopropyl peroxydicarbonate; and azo compounds such as $\alpha, \alpha'$-azobisisobutyronitrile and $\alpha, \alpha'$-azobis-2,4-dimethylvaleronitrile, which may be used singly or as a mixture of two or more.

These polymerization initiators are used generally in an amount of 0.01 to 5 parts by weight per 100 parts by weight of the monomer.

OTHER ADDITIVES

In the present process, if required, a regulator, a pH adjustor, etc. that are suitably used in the polymerization of vinyl chloride or the like can be added to the polymerization system and these additives may be used in amounts that are commonly employed. These additives may be added to the mixture of water, dispersants, etc. to which a high-speed shearing force will be applied.

POLYMER SCALE PREVENTIVE AGENTS

In the present process, a coating of a polymer scale preventive agent is previously formed on the inner wall of the polymerization vessel to be used and other parts with which the monomer will be contact during the polymerization such as a baffle, agitating elements, an agitating shaft, a condenser, a header, a search coil, bolts, and nuts.

There is no particular restriction on the type of the polymer scale preventive agent to be used and examples of the polymer scale preventive agent include dyes, pigments, water-soluble polymers, nitrites, nitrogen-containing aromatic compounds, heterocyclic compounds, iodine compounds, and condensates of aromatic amines.

More specifically, examples are described, for example, in Japanese Patent Publication (kokoku) Nos. 46-16084 (1971), 45-30343 (1970), 46-4573 (1971), 45-37988 (1970), 46-20821 (1971), 45-30835 (1970), 48-29795 (1973), 51-21672 (1976), 51-37306 (1976), 51-37308 (1976), 51-24953 (1976), 53-6023 (1978), 53-6024 (1978), 53-6025 (1978), 53-6026 (1978), 53 21908 (1978), 53-28347 (1978), 53-28348 (1978), 53-46235 (1978), 59-1413 (1984), 58-13564 (1983), 56-5442 (1981), 56-5443 (1981), 56-5444 (1981), 59-34721 (1984), 58-11884 (1983), 60-6361 (1985), 59-31522 (1984), 60-48522 (1985), 60-48523 (1985), 51-1471 (1976), 51-1472 (1976), 57-59243 (1982), 55-5523 (1980), 56-22445 (1981), 56-22447 (1981), 57-31730 (1982), 57-47922 (1982), 60-59246 (1985), 61-25730 (1986), 52-24070 (1977), 55-4327 (1980), 58-12893 (1983), 58-14444 (1983), 58-14445 (1983), 58-14446 (1983), 58-14447 (1983), 60-42245 (1985), 61 21147 (1986), 61-842 (1986), 61-843 (1986), 49 2992 (1974), 53-36509 (1978), 57 34286 (1982), 60-40444 (1985), and 60-59247 (1985); and Japanese Pre-examination Patent Publication (kokai) Nos. 57-195702 (1982), 57-198710 (1982), 58-11504 (1983), 58-180509 (1983), 58-180510 (1983), 59-78210 (1984), 60 20909 (1985), 54-50089 (1979), 54-101889 (1979), 55-21436 (1980), 55-73709 (1980), 55-98207 (1980), 55-112209 (1980), 58-8709 (1983), 58-61104 (1983), 58-168607 (1983), 58-180511 (1983), 58-204006 (1983), 60-71614 (1985), 55-54305 (1980), 55-54317 (1980), 57-192413 (1982), 57 192414 (1982), 59-129207 (1984), 61-7309 (1986), 53-108187 (1978), 59-184202 (1984), 59-202201 (1984), 59-210902 (1984), 60-47002 (1985), 60-71601 (1985), 60-72902 (1985), 60-96603 (1985), 60-233103 (1985), 61-31406 (1986), 61-34006 (1986), 61-51001 (1986), 61-51002 (1986), 55-155001 (1980), 55-155002 (1980), 56-112903 (1981), 58-69203 (1983), 58-101103 (1983), 58-103503 (1983), 58 210902 (1983), 59-11303 (1984), and 59-170102 (1984).

There are various methods for forming a coating wherein these polymer scale preventive agents are used and there is no particular restriction on the method for forming such a coating. For example, a method for forming a coating can be mentioned wherein a polymer scale preventive agent is dissolved or dispersed in a solvent such as water or an organic solvent to prepare a coating liquid and the coating liquid is applied. There are no restrictions on the type of the solvent used for the preparation of the coating liquid, on the method for applying the coating liquid, on whether a drying operation is carried out or not after the application of the coating liquid, and on the drying method if carried out, and all known methods for the application can be used.

A preferable polymer scale preventive agent used in the present invention is a mixture containing a water-soluble anionic dye, a water-soluble cationic dye, and a phytic acid and a more preferable polymer scale preventive agent is one obtained by adding a monohydric alcohol having 4 to 6 carbon atoms to the above mixture.

The water-soluble anionic dye includes, for example, water-soluble azo dyes, water-soluble anthraquinone dyes, water-soluble triallylmethane dyes, water-soluble xanthene dyes, water-soluble azine dyes, water-soluble quinoline dyes, water-soluble nitro dyes, and water-soluble phthalocyanine dyes.

The water-soluble azo dyes include, for example, C.I. Acid Orange 7, C.I. Acid Red 37, C.I. Acid Red 264, C.I. Acid Blue 113, C.I. Acid Black 1, C.I. Acid Yellow 42, C.I. Acid Blue 158, C.I. Acid Green 12, C.I. Acid Orange 97, C.I. Acid Black 124, C.I. Direct Yellow 50, C.I. Direct Red 37, C.I. Direct Red 2, C.I. Direct Violet 12, C.I. Direct Blue 1, C.I. Direct Brown 1, C.I. Direct Black 77, C.I. Direct Green 1, C.I. Direct Orange 26, C.I. Direct Red 79, C.I. Direct Red 31, C.I. Direct Black 32, C.I. Direct Yellow 12, C.I. Direct Orange 41, C.I. Direct Red 113, C.I. Direct Yellow 28, C.I. Direct Green 26, C.I. Direct Red 81, C.I. Direct Violet 51, C.I. Direct Blue 71, C.I. Direct Brown 37, and C.I. Direct Black 19.

The water-soluble anthraquinone dyes include, for example, C.I. Acid Blue 40, C.I. Acid Red 80, and C.I. Acid Green 41 and the water-soluble triallylmethane dyes include, for example, C.I. Acid Blue 1, C.I. Acid Violet 17, and C.I. Acid Green 16. The water-soluble xanthene dyes include, for example, C.I. Acid Red 87 and C.I. Acid Red 52 and the water-soluble azine dyes include, for example, C.I. Acid Blue 59 and C.I. Acid Black 2. The water-soluble quinoline dyes include, for example, C.I. Acid Yellow 3 and C.I. Acid Yellow 7, the water-soluble nitro dyes include, for example, C.I. Acid Orange 3 and C.I. Acid Yellow 1, and the water-soluble phthalocyanine dyes include, for example, C.I. Direct Blue 86.

The water-soluble cationic dye includes, for example, water-soluble azine dyes such as C.I. Basic Red 2, C.I. Basic Blue 16, and C.I. Basic Black 2; water-soluble acridine dyes such as C.I. Basic Orange 14 and C.I. Basic Orange 15; water-soluble triphenylmethane dyes such as C.I. Basic Blue 1, C.I. Basic Violet 3, C.I. Basic Blue 26, C.I. Basic Violet 14, C.I. Basic Blue 5, and C.I. Basic Blue 7; water-soluble thiazine dyes such as C.I. Basic Blue 9, C.I. Basic Yellow 1, C.I. Basic Blue 24, C.I. Basic Blue 25, and C.I. Basic Green 5; water-soluble methine dyes such as C.I. Basic Red 12 and C.I. Basic Yellow 11; water-soluble diphenylmethane dyes such as C.I. Basic Yellow 2; water-soluble xanthene dyes such as C.I. Basic Violet 10 and C.I. Basic Red 1; water-soluble azo dyes such as C.I. Basic Orange 2 and C.I. Basic Brown 1; water-soluble azo dyes such as C.I. Basic Orange 2 and C.I. Basic Brown 1; and water-soluble oxazine dyes such as C.I. Basic Blue 12 and C.I. Basic Blue 6.

The phytic acids include phytic acid (inositol hexaphosphate) and its derivatives. Specifically, those described in Japanese Patent Publication No. 52-39957 (1977) are exemplified such as various metal salts, amine salts, and ammonium salts of phytic acids. Out of these phytic acid salts, water-soluble ones are particularly preferable because those hardly soluble in water cannot give an excellent polymer scale preventive effect if they are used.

Examples of the monohydric alcohol having 4 to 6 carbon atoms include n-butyl alcohol, isobutyl alcohol, sec-butyl alcohol, t-butyl alcohol, n-amyl alcohol, t-amyl alcohol, isoamyl alcohol, sec-amyl alcohol, and sec-hexyl alcohol. One or more of these are added in such amounts that the total concentration thereof in the finally prepared coating liquid for preventing polymer scale from depositing is about 1 to 20 wt. %.

When the pH of the thus prepared coating liquid is 7.0 or below, preferably when the coating liquid is an aqueous acid solution having a pH of 4.0 or below, a particularly excellent polymer scale preventive effect can be secured. If the pH of the coating liquid is over 7.0, or the coating liquid has a pH below 7.0 but greater than a preferable pH, the pH of the coating liquid is required to be adjusted as follows. For example, when the water-soluble anionic dye, the water-soluble cationic dye, the phytic acid, and if desired, the alcohol having 4 to 6 carbon atoms are mixed, a lower phytic acid salt, for example, a phytic acid salt wherein 1 to 4 hydroxyl groups out of 12 hydroxyl groups at the 6 phosphoric acid residues of phytic acid form salts is mixed as the phytic acid in such an amount that the pH of the resulting coating liquid will be 7 or below, preferably 4 or below. Other pH adjusting means is a method wherein a suitable acid is added as a pH adjustor. In this case, the acid to be used includes, for example, sulfuric acid, hydrochloric acid, phosphoric acid, nitric acid, carbonic acid, perchloric acid, molybdic acid, tungstic acid, formic acid, acetic acid, oxalic acid, lactic acid, maleic acid, glycolic acid, and thioglycolic acid.

Other preferable polymer scale preventive agents include nitrogen-atom-containing organic compounds such as amine compounds, compounds having an azine ring, and compounds having a group selected from the group consisting of an azomethine group, a nitroso group, a nitro group, and an azo group described in Japanese Patent Publication 45-30343 (1970).

Specifically, examples are azomethane, azobenzene, nitrobenzene, nitrosobenzene, monoaminomononitroazobenzene, pyrazine, pyridine, thiazine, oxazine, aniline, benzalaniline, EDTA, α-naphthylamine, ethanolamine, diethanolamine, Methylene Blue, Nigrosine Black, oil black, spirit black, and glue; sulfur-atom-containing compounds selected from the group of compounds having a thiocarbonyl group, a thioether group, or a thioalcohol group such as thioglycolic acid, thiouric acid, thiocarbanilic acid, thiocarbamic acid, thiobenzoic acid, mercaptans and thioethers represented by the formula:

R—S—R' wherein R and R', which may be the same or different, each represent an alkyl group;

quinone compounds, ketone compounds, aldehyde compounds such as parabenzoquinone, various Alizarine dyes, cetyl alcohol, stearyl alcohol, octyl alcohol acetone, formaldehyde, acetaldehyde, and benzaldehyde.

ACTION OF A HIGH-SPEED SHEARING FORCE

In the present process, a high-speed shearing force is applied to the mixture of water, a monomer, dispersants, a polymerization initiator, and, if required, additives before the polymerization so that the monomer in the mixture may be dispersed.

Specifically, after a weak-shearing force is applied to the mixture as required for preliminary dispersion, high-speed shear-mixing is carried out by a disperser thereby applying a high-speed shearing force to the mixture so that the monomer may be forcibly dispersed into the form of fine droplets. It is required that the shearing speed of the disperser in said high-speed shear-mixing is of the order of $10^5$ to $10^6$ sec$^{-1}$. Examples of such a disperser include a high-speed mixer, a high-speed pump, a colloid mill, and a disperser equipped with a high-pressure jet nozzle and more specifically a high-speed pump type homogenizer, a turbine type homogenizer, and a high-pressure type homogenizer.

The high-speed shear-mixing is carried out at a temperature below 30° C. If the high-speed shear-mixing is carried out at a temperature higher than 30° C., it brings about the polymerization, which loses the meaning that the high-speed shear-mixing is carried out prior to the start of the polymerization. It is generally enough that the high-speed shear-mixing is carried out for about 0.05 to 5 sec and it is required that the high-speed shear-mixing disperses the monomer into the form of fine droplets having a particle diameter of 0.1 to 10 μm, particularly preferably 0.5 to 5 μm.

If the above-mentioned preliminary dispersion is carried out, the components of the mixture are, for example, charged into a preliminary mixing tank and a usual mixer is used at room temperature.

The high-speed shear-mixing may be carried out in such a manner that the components of the mixture are charged into a dispersion tank different from the polymerization vessel, and after the high-seed shear-mixing is carried out in said dispersion tank, the dispersion in the dispersion tank is transferred into the polymerization vessel. Although the order in which the components are charged may be arbitrary, generally it is preferable that after the water, the polymerization initiator, the dispersants, etc. are charged, the monomer is charged.

According to the present invention, the action of the high-speed shearing force causes the dispersants to be adsorbed adequately to the surfaces of the fine droplets of the monomer, so that the polymerization system is stabilized. As a result, the amounts of the dispersants to be used can be reduced and deposition of polymer scale on the polymerization vessel wall can also be effectively prevented. Further, the action of the high-speed shearing force disperses the polymerization initiator onto the droplet surfaces of the monomer, so that fish eyes decrease remarkably.

SUSPENSION POLYMERIZATION

After the mixture is dispersed by the action of a high-speed shearing force as described above, the suspension polymerization is started in a polymerization vessel to which the above polymer scale preventive agent has been applied.

Specifically, the temperature of the dispersion charged in the polymerization vessel is elevated to 40 to 80° C., and the polymerization is effected with stirring (for example, in the case of homopolymerization of vinyl chloride, the pressure in the polymerization vessel will reach 590 to 1,600 kPa during the polymerization. During the polymerization, if required, one or more selected from the group consisting of water, dispersants, and a polymerization initiator are added. Although the polymerization time varies depending on the degree of polymerization of the intended polymer, generally the polymerization time is of the order of 3 to 10 hours. It is judged that the polymerization is completed when the difference between the temperature at the cooling water inlet and the temperature at the cooling water outlet, through which inlet and outlet cooling water is introduced and leave the jacket mounted around the polymerization vessel, has become almost zero, that is, when the heat generated by the polymerization reaction has subsided). The stirring must be conducted such that an agitation power of 50 to 200 kg.m/sec.ton, preferably 70 to 180 kg.m/sec.ton is applied to the reaction mixture. If the agitation power is not in the range specified above, the suspension system under polymerization is unstable, causing various unfavorable phenomenon, for example, agglomeration of particles or formation of bulky polymeric products; hence uniform polymer particles cannot be produced. After the completion of polymerization unreacted monomer in the polymerization vessel is recovered and the produced polymer in the polymerization vessel is dehydrated and dried to obtain the intended product polymer.

EXAMPLES

The present invention will now be described in detail with reference to Examples and Comparative Examples.

EXAMPLE 1

As a polymer scale preventive agent, a coating liquid was prepared by dissolving 0.2 g of C.I. Basic Orange 14 and 1 g of C.I. Acid Blue 2 disclosed in Japanese Patent Publication (kokai) No. 56-5443 (1981) in 1,000 ml of deionized water and adding phytic acid to the mixture. The coating liquid was applied to the inner wall, the agitating blades, and the baffle of a polymerization vessel (autoclave) having an internal volume of 100 liter, and after the coating was heated and dried at 60° C. for 10 min, the coating was washed with water.

Then, 60 kg of pure water (polymerization medium), 2.7 g of a partially saponified polyvinyl alcohol (dispersant) (A) having an average degree of polymerization of 2,000 and a degree of saponification of 80 mol %, 6.3 g of a hydroxypropylmethylcellulose (dispersant) (B) which has a methoxyl substitution degree of 29 wt. % and a hydroxypropoxyl substitution degree of 10 wt. % and the 2 wt. % aqueous solution of which has a viscosity of 50 cP at 20° C., and 12.6 g of bis(2-ethylhexyl) peroxydicarbonate (polymerization initiator) were charged into a preliminary mixing tank equipped with a mixer and after the deaeration was effected, 30 kg of vinyl chloride (monomer) was charged, and the mixture was stirred at room temperature (25° C.) with the rotational frequency of the mixer being 330 rpm.

Thereafter, the mixture in the preliminary mixing tank was passed (corresponding to a shear rate of $10^5$ sec$-1$) through a two-step high-speed high-pressure jet type homogenizer (model: 15M-8BA, manufactured by Monton-Gaulin) under a pressure of 100 kg/cm$^2$ in a first step and a pressure of 0 kgf/cm$^2$ in a second step and the thus homogenized dispersion was introduced into the above polymerization vessel coated with the polymer scale preventive agent. Then, the temperature in the polymerization vessel was started to elevate with the reaction mixture being stirred by means of an agitator rotating at 330 rpm (an agitator power of 110 kg.m/sec.ton) and, the polymerization was effected at 56.3° C. (the pressure in the polymerization vessel during the polymerization was 906 kPa). When the pressure in the polymerization vessel lowered to 640 kpa, it was judged that the polymerization was completed and the polymerization reaction was stopped. Thereafter, unreacted monomer in the polymerization vessel was recovered and the product polymer in the polymerization vessel was dehydrated and dried to obtain the vinyl chloride polymer.

With respect to the thus obtained vinyl chloride polymer, the apparent specific gravity, the particle size distribution, the plasticizer take-up, and fish eyes were measured by the methods of measurement given below under 1 to 4. The state of the deposition of the polymer scale on the inner wall surface of the polymerization vessel after the completion of the polymerization was judged based on the criteria given below under 5. The results of the measurements and the observation are shown in Table 1.

1) Fish eyes 25 g of the composition of 100 parts by weight of the vinyl chloride polymer, 50 parts by weight of DOP (dioctylphthalate), 0.5 part by weight of a tribasic sulfate, 1.5 parts by weight of lead stearate, 0.1 part by weight of titanium oxide, and 0.05 of carbon black was kneaded by a kneading 6" roll at 140° C. for 5 min and was formed into a sheet having a width of 10 cm and a thickness of 0.2 cm. the number of transparent grains per 100 cm$^2$ of the obtained sheet was counted and was designated as index of fish eyes.

2) Apparent specific gravity

The apparent specific gravity was measured in accordance with JIS K-67.

3) Particle size distribution

The particle size distribution was measured by using a particle diameter analyzer (Micro track particle-size analyzer, manufactured by Leed & Northrup).

4) Plasticizer take-up 20 g of DOP was added to 10 g of the vinyl chloride polymer and after the mixture was allowed to stand for 1 hour, unabsorbed DOP was separated and removed by a centrifugal separator and the amount (wt. %) of the DOP absorbed into the vinyl chloride polymer was designated as plasticizer take-up.

5) State of deposition of polymer scale

The wall of the polymerization vessel after the completion of the polymerization was visually observed and the state of deposition of polymer scale was judged on the basis of the following criteria:

A: there was almost no deposition of polymer scale.
B: Partial deposition of polymer scale was observed.
C: Deposition of polymer scale was observed all over the inner wall of the polymerization vessel.

EXAMPLES 2 to 4

The polymerization of Example 1 was repeated, except that the charges of (A) and (B) were changed as shown in Table 1. Properties of the obtained polymers were measured. The results are shown in Table 1.

EXAMPLES 5 to 7

The polymerization of Example 1 was repeated, except that each of various polymer scale preventive agents shown in Table 1 was applied to the inner wall, the agitating blades, and the baffle of each of 100-liter polymerization vessels (autoclaves) and was dried by heating at 50° C. for 10. Properties of the obtained polymers were measured. The results are shown in Table 1.

EXAMPLES 8 to 10

Coating agent-IV: a coating liquid obtained by treating a diaminonaphthalene/Nigrosine solution with thiophenol at 90° C. for 30 min used in Japanese Patent Publication (kokai) No. 53-46235 (1978).

TABLE 1

|  | Examples | | | | | | | | | | Comparative examples | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 1 | 2 | 3 | 4 |
| (A)/(B) Weight ratio | 4/6 | 1/20 | 4/10 | 3/8 | 1/10 | 2/8 | 4/15 | 4/6 | 4/6 | 4/6 | 8/2 | 1/30 | 4/6 | 4/6 |
| (A) + (B) Weight % based on the monomer | 0.03 | 0.03 | 0.02 | 0.04 | 0.05 | 0.03 | 0.02 | 0.03 | 0.03 | 0.03 | 0.03 | 0.03 | 0.03 | 0.03 |
| Homogenizer | Used | Used | Used | Used | Used | Used | Used | Used | Used | Used | Used | Used | Used | Not Used |
| Pressure (kg/cm$^2$) in the first step | 100 | 100 | 100 | 100 | 100 | 100 | 100 | 100 | 200 | 300 | 100 | 100 | 100 | — |
| Pressure (kg/cm$^2$) in the second step | 0 | 0 | 0 | 0 | 0 | 0 | 0 | 100 | 0 | 0 | 0 | 0 | 0 | — |
| Shearing rate (sec$^{-1}$) | $1 \times 10^5$ | $1 \times 10^5$ | $1 \times 10^5$ | $1 \times 10^5$ | $1 \times 10^5$ | $1 \times 10^5$ | $1 \times 10^5$ | $1 \times 10^5$ | $4 \times 10^5$ | $8 \times 10^5$ | $1 \times 10^5$ | $1 \times 10^5$ | $1 \times 10^5$ | — |
| Polymer scale preventive agent* | -I | -I | -I | -I | -II | Coating agent -III | -IV | -I | -I | -I | -I | -I | Not coated | Coating agent-I |
| Apparent specific gravity (g/cc) | 0.510 | 0.501 | 0.522 | 0.518 | 0.500 | 0.520 | 0.510 | 0.521 | 0.515 | 0.518 | *(1) | 0.510 | 0.508 | *(1) |
| Particle size distribution % | | | | | | | | | | | | | | |
| Passed through 400 μm | 70.1 | 65.0 | 38.4 | 90.5 | 99.8 | 66.0 | 45.3 | 71.9 | 72.4 | 75.1 |  | 40.3 | 68.1 |  |
| Remained (700 μm) | 0 | 0 | 0 | 0 | 0 | 0 | 0 | 0 | 0 | 0 |  | 0 | 0 |  |
| Average particle diameter (μm) | 325 | 360 | 500 | 280 | 210 | 335 | 450 | 330 | 323 | 318 |  | 510 | 350 |  |
| Plasticizer take-up (wt. %) | 25.4 | 27.0 | 26.5 | 25.9 | 25.5 | 25.0 | 25.3 | 25.0 | 26.0 | 26.5 |  | 23.5 | 25.5 |  |
| Number of fish eye | 0 | 1 | 1 | 2 | 1 | 1 | 3 | 0 | 0 | 0 |  | 5 | 1000 |  |
| Deposition of polymer scale | A | A | A | A | A | A | A | A | A | A |  | A | B |  |

*(1): Stable dispersed particle were not obtained.

The polymerization of Example 1 was repeated, except that the operating condition (shearing rate) of the two-step high-speed high-pressure jet type homogenizer was changed as shown in Table 1. Properties of the obtained polymers were measured. The results are shown in Table 1.

COMPARATIVE EXAMPLES 1 to 2

The polymerization of Example 1 was repeated, except that the weight ratio of (A) and (B) was changed as shown in Table 1. Properties of the obtained polymers were measured. The results are shown in Table 1.

COMPARATIVE EXAMPLE 3

The polymerization of Example 1 was repeated, except that the polymer scale preventive agent was not used. Properties of the obtained polymer were measured. The results are shown in Table 1.

COMPARATIVE EXAMPLE 4

The polymerization of Example 1 was repeated, except that the homogenizer was not used. Properties of the obtained polymer were measured. The results are shown in Table 1.

In Table 1, coating agents I, II, III, and IV in the polymer scale preventive agent column marked with * are as follows:

Coating agent-I: a coating agent used in Experiment No. 4 in Japanese Patent Publication (kokai) No. 56-5443 (1981).

Coating agent-II: a coating agent containing C.I. Acid Orange 3, C.I. Basic Orange 14, and phytic acid used in Experiment No. 40 in Japanese Patent Publication (kokai) No. 56-5443 (1981).

Coating agent-III: an aqueous solution of C.I. Acid Black 2 and iron(I) chloride described in Experiment No. 79 of Example 1 in Japanese Patent Publication (kokai) No. 56-5442 (1981).

EXAMPLE 11

The coating liquid prepared in the same manner as in Example 1 was applied to the inner wall, etc. of an autoclave having an internal volume of 100 liter in the same manner as in Example 1. The formed coating was washed with water.

Then, 60 kg of pure water (polymerization medium), 4.8 g of a partially saponified polyvinyl alcohol (dispersant) (A) having an average degree of polymerization of 2,550 and a degree of saponification of 80 mol %, 7.2 g of a hydroxypropylmethylcellulose (dispersant) (B) which has a methoxyl substitution degree of 29 wt. % and a hydroxpropoxyl substitution degree of 10 wt. % and the 2 wt. % aqueous solution of which has a viscosity of 50 cp at 20° C., and 3 g of a partially saponified polyvinyl alcohol having an average particle diameter of 500 μm, a degree of polymerization of 235 and a degree of saponification degree of 48 mol % (C) were charged into a preliminary mixing tank equipped with a mixer. The charge of the (A), (B) and (C) above was conducted by previously mixing uniformly the solution of (A) and (B) in 1 liter of pure water with the solution of (C) in 50 ml of methanol and then charging the mixture thus obtained.

Further, in said preliminary mixing tank, 12.6 g of bis(2-ethylhexyl)peroxydicarbonate was added, and after the deaeration was effected, 30 kg of vinyl chloride (monomer) was charged, and the mixture was stirred at room temperature (25° C.) with the rotational frequency of the mixer being 330 rpm.

Thereafter, the mixture in the preliminary mixing tank was passed (corresponding to a shear rate of $10^5$ sec$^{-1}$) through a two-stop high-speed high-pressure jet type homogenizer (model: 15M-8BA, manufactured by Monton-Gaulin) under a pressure of 100 kg/cm$^2$ in a first step and a pressure of 0 kg/cm$^2$ in a second step and the thus homogenized dispersion was introduced into the above polymerization vessel coated with the polymer scale preventive agent. Then, the temperature in the polymerization vessel was started to elevate with the reaction mixture being stirred by means of an agitator rotating at 300 rpm (an agitation power of 85 kg.m/sec.ton) and the polymerization was effected at 56.3° C. (the pressure in the polymerization vessel during the polymerization was 906 kPa). When the pressure in the polymerization vessel lowered to 640 kPa, it was judged that the polymerization was completed and the polymerization reaction was stopped. Thereafter, unreacted monomer in the polymerization vessel was recovered and the product polymer in the polymerization vessel was dehydrated and dried to obtain the vinyl chloride polymer.

With respect to the thus obtained vinyl chloride polymer, the apparent specific gravity, the particle size distribution, the plasticizer take-up, and fish eyes were measured in the same manner as in Example 1.

EXAMPLE 12

The polymerization of Example 11 was repeated, except that the amounts of (A) and (B) were changed as shown in Table 2.

COMPARATIVE EXAMPLE 5

The polymerization of Example 11 was repeated, except that the treatment with the homogenizer was not conducted.

COMPARATIVE EXAMPLE 6

The polymerization of Example 11 was repeated, except that the treatment with the homogenizer was not conducted and that the rotating rate of the agitator or the agitation power by the agitator was changed as shown in Table 2.

The results of Examples 11 and 12 and Comparative Examples 5 and 6 are shown in Table 2.

TABLE 2

| | Examples | | Comparative Examples | |
|---|---|---|---|---|
| | 11 | 12 | 5 | 6 |
| (A)/(B) Weight ratio | 4/6 | 4/6 | 4/6 | 4/6 |
| (A) + (B) Weight % based on the monomer | 0.04 | 0.035 | 0.04 | 0.04 |
| (C) Weight % based on the monomer | 0.01 | 0.01 | 0.01 | 0.01 |
| Homogenizer | Used | Used | Not used | Not used |
| Pressure (kg/cm$^2$) in the first step | 100 | 100 | — | — |
| Pressure (kg/cm$^2$) in the second step | 0 | 0 | — | — |
| Shearing rate (sec$^{-1}$) | 1 × 10$^5$ | 1 × 10$^5$ | — | — |
| Rotating rate (rpm) | 300 | 300 | 300 | 300 |
| Agitation power (kg · m/sec · ton) | 85 | 85 | 85 | 110 |
| Apparent specific gravity (g/cc) | 0.542 | 0.552 | *(1) | 0.532 |
| Particle size distribution (%) | | | | |
| Passed through 400 μm | 92.3 | 85.8 | | 100 |
| Remained (700 μm) | 0 | 0 | | 0 |
| Average particle diameter (μm) | 250 | 290 | | 150 |
| Plasticizer take-up (wt. %) | 26.1 | 25.4 | | 25.1 |
| Number of fish eye | 0 | 0 | | 0 |
| Deposition of polymer scale | A | A | | A |

*(1): Stable dispersed particle were not obtained.

We claim:

1. A process for producing a vinyl chloride polymer having an average particle diameter of 200–600 μm by polymerizing a monomer having an ethylenic double bond and comprising vinyl chloride as an essential component in an aqueous medium by suspension polymerization in a polymerize vessel on the inner wall surface of which a coating of a polymer scale preventive agent has been previously formed, comprising the steps of previously applying a high-speed shearing force to a mixture comprising water, said monomer, a polymerization initiator, and (A) a dispersant comprising a partially saponified polyvinyl alcohol having an average degree of polymerization of 1,1500 to 2,500 and a degree of saponification of 70 to 99 mol % plus (B) a dispersant comprising a hydroxypropylmethylcellulose which has a methoxyl substitution degree of 15 to 35 wt. % and a hydroxypropoxyl substitution degree of 4 to 15 wt. % and the 2 wt. % aqueous solution of which has a viscosity of 5 to 4,000 cP at 20° C. with the weight ratio (A)/(B) of the dispersant (A) to (B) being from 1/20 to 4/6 and the combined amount of the dispersant (A) and the dispersant (B) being 0.01 to 0.05 part by weight per 100 parts by weight of said monomer, and then subjecting the mixture to said suspension polymerization in said polymerization vessel under an agitation power of 50 to 200 kg.m/sec.ton.

2. A process as claimed in claim 1, wherein said dispersant (A) has an average degree of polymerization of 1,700 to 2,200 and a degree of saponification of 75 to 85%.

3. A process as claimed in claim 1, wherein said dispersant (B) has a methoxyl substitution degree of 19 to 30 wt. % and a hydroxypropoxyl substitution degree of 6 to 12 wt. %.

4. A process as claimed in claim 1, wherein said dispersant (B) has a viscosity of 50 to 2,000 cP in the 2 wt. % aqueous solution.

5. A process as claimed in claim 1, wherein said weight ratio of the dispersant (A)/dispersant (B) is from 1/15 to 4/6.

6. A process as claimed in claim 1, wherein said combined amount of the dispersant (A) and the dispersant (B) is 0.02 to 0.04 part by weight per 100 parts by weight of the monomer.

7. A process as claimed in claim 1, wherein said monomer is vinyl chloride.

8. A process as claimed in claim 1, wherein said monomer comprises vinyl chloride and at least one monomer selected from the group consisting of vinyl esters, acrylates, methacrylates, olefins, maleic anhydride, acrylonitrile, styrene, and vinylidene chloride.

9. A process as claimed in claim 1, wherein said polymer scale preventive agent comprises a water-soluble anionic dye, a water-soluble cationic dye, and a phytic acid.

10. A process as claimed in claim 1, wherein said high-speed shearing force is applied at a shear rate of the order of 10$^5$ to 10$^6$ sec$^{-1}$.

11. A process as claimed in claim 1, wherein said high-speed shearing force is applied at a temperature of less than 30° C.

12. A process as claimed in claim 1, wherein said high-speed shearing force is applied so that the monomer may be formed into droplets having a particle diameter of 0.1 to 10 μm.

13. The process of claim 1, wherein said suspension polymerization produces a vinyl chloride polymer having an average particle diameter of 200–600 μm.

14. The process of claim 1, wherein said agitation power is 70 to 180 kg.m/sec.ton.

15. The process of claim 1, wherein said combined amount of dispersant (A) and the dispersant (B) is 0.035 to 0.04 parts by weight per 100 parts by weight of the monomer.

* * * * *